Nov. 27, 1945. F. R. REEVELY 2,389,870
CARRIER AND APPLICATOR FOR THE TREATMENT OF TREES
Filed Nov. 14, 1942
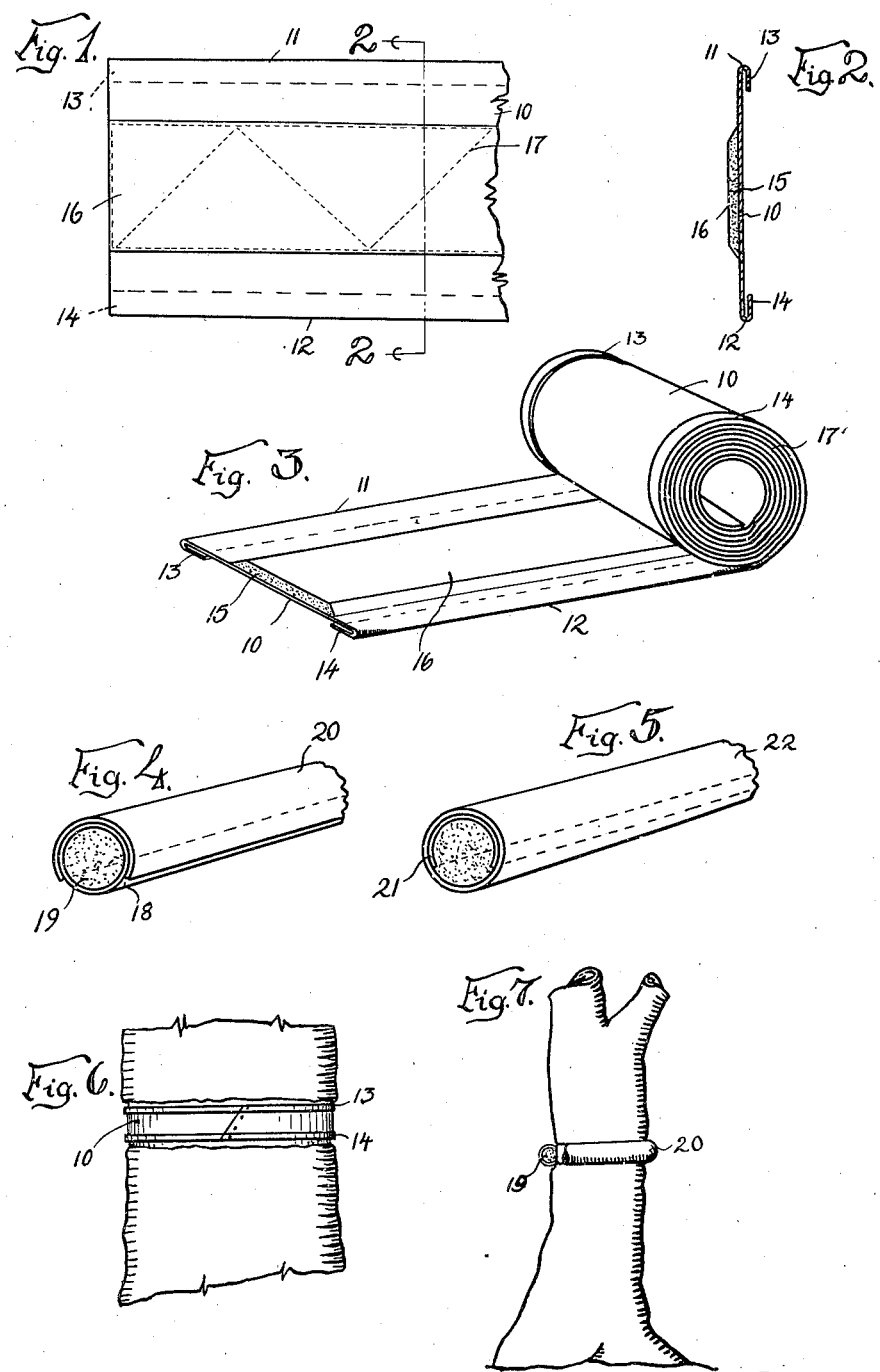
Inventor.
F. R. Reevely.
E. R. Fetherstonhaugh.
ATTORNEY.

Patented Nov. 27, 1945

2,389,870

UNITED STATES PATENT OFFICE 2,389,870

CARRIER AND APPLICATOR FOR THE TREATMENT OF TREES

Frederick Richard Reevely, St. Lambert, Quebec, Canada

Application November 14, 1942, Serial No. 465,828

2 Claims. (Cl. 47—57.5)

The invention relates to a carrier and applicator of organic and/or inorganic substances for the treatment of trees and the like as described in the present specification and illustrated in the accompanying drawing that forms a part of the same.

The invention consists essentially of the novel features of construction and application of the carrier and applicator as pointed out broadly and specifically in the claims for novelty following a description containing an explanation in detail of the acceptable forms of the invention.

The objects of the invention are to devise a means for transporting specific ingredients either in a powdery, granular, solid, semi-solid or in a pliable form to the place of application such as in the wood where trees are to be treated or wherever these ingredients are to be used and this means will be in the form of a carrier for the transportation and will be converted into an applicator to the trees or other article to be treated; to save considerable time and expense both in the actual mixing of the substances by the workman or other person and in the actual application thereof; to avoid the necessity of using skilled labor in the handling and applying of the mixture to the trees owing to the simplicity of the carrier binding and properly proportioned mixture therein and the adaptability of the carrier to form its own applicator; to produce the carrier and applicator in a continuous strip and the introduction of the properly proportioned chemicals thereto and thereby speed up the manufacture of such an article in the form of mass production and which can be easily handled and carried about and thereby save the use of space in transportation and storage and effect an efficient system for carrying and applying the necessary ingredients to the location where they are to be used; and generally to provide a carrier and applicator that will be simple to manufacture, economical in cost and easy to apply.

In the drawing:

Figure 1 is a fragmentary plan view of a carrier and applicator.

Figure 2 is a cross sectional view as taken on the lines 2—2 in Figure 1.

Figure 3 is a perspective view of the carrier and applicator in the form of a roll ready for transportation and use.

Figure 4 is a fragmentary perspective view of a modified form of carrier and applicator.

Figure 5 is another modified form of the invention.

Figure 6 is a fragmentary view of a tree showing the application of the invention as illustrated in Figures 1 to 3 as applied thereto.

Figure 7 is a fragmentary view of a tree showing the application of the invention as illustrated in Figures 4 and 5 as applied thereto.

In the past it has been well known to apply ingredients in the doctoring of trees through manual manipulation on the part of the tree surgeon or other person and using a brush and having the solvents dissolved in a suitable solution, generally contained in a can or other type of carrier of that nature and consequently it will be noticed that the composition of matter is generally prepared on the spot or prepared from a distance and placed in cans or in tubes. Furthermore it is well known to provide jackets containing certain solutions and applying such jackets to telegraph posts, etc., preferably to that part of the post that is beneath the surface of the ground and it is the purpose of this invention to supply a convenient carrier in roll form or other suitable shape for easy transportation and this carrier will be used as the actual applicator as it will contain the necessary toxicant or other substance that is to be absorbed by the tree or other article of such nature.

Primarily this invention is to be used for the purpose of forming a carrier and an applicator for toxicants such as sodium chlorate, calcium chloride, etc., which is to be applied to living trees for the absorption of the toxicant into the sap stream thereof for the particular purpose of separating the cortex from the cambium as more particularly described in a patent issued to Alexander Robert White, in the United States of America, under Patent No. 2,324,968, and dated July 20, 1943, wherein the complete teachings for accomplishing this purpose is set forth.

This invention as mentioned above is primarily to cover an acceptable type of carrier and applicator to be used in the White invention, but it will of course be understood that the present carrier and applicator may be used for other purposes in timber whether it is applied to the living tree or to the timber after it has been cut.

Like numerals of reference indicate corresponding parts in the various figures.

Referring to the drawing, an acceptable form of the invention is illustrated in Figures 1, 2 and 3 in the drawing and this form consists of a flat strip of impermeable material as indicated by the numeral 10 and may or may not have its side edges 11 and 12 folded to form side flanges 13 and 14 and in the approximate inner central portion of this impermeable sheet is located the toxicant or other substance 15 and this toxicant is held in position by means of a strip of permeable material 16 and this strip of permeable material is secured to the impermeable material by means of sewing, stapling, adhesive means or other suitable type of fastening.

In order that the substance may be held from lateral movement, stitching or stapling 17 may be made through the permeable and impermeable material and through the substance, or in certain cases the substance may be caked at predetermined locations, in other words forming bosses or undulations which engage with either or both of the surfaces of the outer and inner strips.

In this way the invention forms a carrier and applicator and it is preferable to have the strips and the accompanying toxicant in the form of a continuous roll as indicated by the numeral 17' and in that way the roll may be carried by the user and strips are simply cut off in sufficient lengths to be applied around the body of the tree, but naturally before its application a section of the bark is completely removed from the tree and this section being in the form of a complete circle around the tree, the carrier is then applied to this barkless section with the permeable strip abutting the cambium while the impermeable strip is located exteriorly and prevents moisture and other foreign matter from entering the substance which is to be drawn through the sap stream of the tree. The free ends of the carrier and applicator simply overlap one another, or criss-cross and are fastened by a tack or other fastening member.

The purpose of providing the flanges 13 and 14 is to keep the layers of the carrier and applicator separate from one another when they are rolled or arranged in tiers, but naturally this may not be necessary in all the various forms of the carrier.

In Figure 4 a modified form of carrier and applicator is illustrated and this is in tubular form, that is to say the permeable strip is in the form of a tubular or cylindrical form 18 and contains the toxicant 19, while the impermeable material is applied exteriorly to the tubular member in the form of a split sleeve 20 which partially covers the circumference of the tubular member leaving just sufficient exposed portion of the permeable material for its introduction to the barkless portion of the tree.

In Figure 5 the modification is somewhat similar to Figure 4 with the exception that the split sleeve 21 is located interior of the permeable tubular member 22 with the same effective results.

It may be more convenient and particularly save much material by applying an impermeable coating to the permeable material so as to make the outer portion of the strip water proof leaving the inner surface in its natural state so as to permit a toxicant to penetrate through the permeable material into the tree. (In that event the preferable form of the carrier and applicator would be tubular.)

The toxicant may be in powdery form, granular, semi-fluid or according to the best methods that are utilized and to the particular application of the same and it may even be possible to provide the toxicant in a pliable form, an impermeable coating may be applied on one of the binders for waterproofing the exterior face of the binder when applied to the article to be treated.

In all the various forms illustrated and/or described, the fundamental principle is the same and that is in providing a carrier and applicator in a continuous strip that may be cut off into lengths at the place of operation and directly applied to the article to be treated and the form of the carrier and applicator may be varied without departing from the essential features of this invention, that is to say it may be in the form of a combination of impermeable and permeable material enclosing the toxicant or other substance or it may be in the form of a permeable material containing the substance and having a portion of the surface painted with an impermeable material to form a water proof section. In the one way the permeable material may be eliminated and simply impermeable strips with the substance utilized, or lastly the impermeable and permeable strips may be entirely eliminated with the substances and binder forming its own carrier and applicator.

Furthermore it may be mentioned that the carrier and applicator may be somewhat in the form of a tubular member made from permeable material and containing the necessary toxicant or other substance without the addition of using an impermeable strip and in this type the carrier and applicator is simply introduced to the portion of the tree or other article from which its outer surface has been removed and in the removal of such a surface a recess is formed and in which the carrier and applicator simply rests and naturally the free ends are secured in the usual manner.

It may also be mentioned that the toxicants or other chemicals may be applied to the permeable material by impregnating, in other words the carrier is formed of permeable material and in the interstices of the strip are introduced the chemicals, in that way the carrier would somewhat resemble a strip of material of a predetermined width such as a strip of paper and this strip will be applied directly to the article to be treated and of course it may or may not be necessary to treat the exterior surface of this paper through waterproofing processes.

It has previously been mentioned in the specification that the chemicals may be caked at predetermined positions for engagement with either or both of the inner surfaces of the permeable and impermeable strips but naturally the chemicals may be caked throughout and in that way the whole surface will somewhat adhere to the surface of one or both of the accompanying strips.

It must be emphasized that among the many objects and purposes of this invention, that in using the combined carrier and applicator in all of the above types mentioned or other types that may be used without in any way departing from the essential features of the invention will effect a control of the quantity and the proportion of the chemicals that are to be used for the treatment of whatever article it is to be applied and similarly it will form an absolute control for the amount of chemicals that the article is to absorb which is a vast improvement over the known art where ordinarily chemicals are applied by brush or other means to the article and may be washed away in the event of a rain storm or other causes, or the chemical if not washed away may be diluted through the addition of such moisture and naturally the result would not be so satisfactory.

In that way it will easily be seen that there is a dual purpose and that is on its eliminating the necessity of the individual in compounding his own ingredients at the location of application as to what amount and proportion he is to apply to the article and secondly there is absolute control of the amount of ingredients and the period of time in which the absorption of such chemicals will be taken up by the article.

I claim:

1. A carrier and applicator of organic and/or inorganic substances for the treatment of trees and the like comprising a roll formed of an outer strip of impermeable material having its longitudinal edges folded to form side flanges, a toxicant located approximately in the inner central portion of the roll throughout, an inner strip of permeable material secured to the impermeable material throughout the roll and completely covering the toxicant thereon, said roll adapted to be cut off into individual strips conforming to the diameter of the tree to be treated and applied thereto with the inner permeable strip in direct contact with the tree surface.

2. A carrier and applicator of organic and/or inorganic substances for the treatment of trees and the like comprising a roll formed of an outer strip of impermeable material having its longitudinal edges folded to form side flanges, a toxicant located approximately in the inner central portion of the roll, an inner strip of permeable material secured longitudinally and laterally to said impermeable strip and completely covering the toxicant thereon, said roll adapted to be cut off into individual strips conforming to the diameter of the tree to be treated and applied thereto with the inner permeable strip in direct contact with the tree surface.

FREDERICK RICHARD REEVELY.